US009369210B2

(12) United States Patent
Toda (10) Patent No.: US 9,369,210 B2
(45) Date of Patent: Jun. 14, 2016

(54) OPTICAL MODULATOR CALIBRATION (71) Applicant: FUJITSU LIMITED, Kawasaki-shi, Kanagawa (JP)

(72) Inventor: Asako Toda, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 14/284,202

(22) Filed: May 21, 2014

(65) Prior Publication Data

US 2015/0341120 A1 Nov. 26, 2015

(51) Int. Cl.
*H04B 10/12* (2006.01)
*H04B 10/516* (2013.01)
*H04B 10/564* (2013.01)
*G02F 1/01* (2006.01)

(52) U.S. Cl.
CPC .............. *H04B 10/516* (2013.01); *G02F 1/01* (2013.01); *H04B 10/564* (2013.01)

(58) Field of Classification Search
CPC .......... G01B 9/02; G02F 1/015; H04B 10/00; H04B 10/07; H04B 10/135; H04B 10/2575; H04B 10/516; H04B 10/70
USPC ................................. 398/195–198
See application file for complete search history.

(56) References Cited

U.S. PATENT DOCUMENTS

| | | | | |
|---|---|---|---|---|
| 5,805,321 A * | 9/1998 | Ooi | ........................ | G02F 1/0123 398/183 |
| 5,825,515 A * | 10/1998 | Anderson | ............ | H04B 10/035 398/10 |
| 6,469,817 B1 * | 10/2002 | Heflinger | .............. | G02F 1/0123 398/202 |
| 7,006,769 B1 * | 2/2006 | Kawasaki | ............. | G02F 1/0121 398/147 |
| 7,977,622 B2 | 7/2011 | McLaren et al. | | |
| 8,179,935 B2 | 5/2012 | Santori et al. | | |
| 8,363,990 B1 * | 1/2013 | Skogen | .................... | G02F 1/015 385/14 |
| 8,615,173 B1 * | 12/2013 | Lentine | ............. | H04B 10/0799 398/182 |
| 8,620,116 B2 * | 12/2013 | Uesaka | ................. | G02F 1/0123 385/1 |
| 9,002,207 B1 * | 4/2015 | Karras | ................... | H04B 10/22 398/115 |
| 9,166,704 B1 * | 10/2015 | Nagarajan | ............. | H04B 10/70 |

(Continued)

OTHER PUBLICATIONS

Amberg, P.; Chang, E.; Liu, F.; Lexau, J.; Xuezhe Zheng; Guoliang Li; Shubin, I.; Cunningham, J.E.; Krishnamoorthy, A.V.; Ron Ho, "A sub-400 fJ/bit thermal tuner for optical resonant ring modulators in 40 nm CMOS," in Solid State Circuits Conference (A-SSCC), 2012 IEEE Asian , vol., No., pp. 29-32, Nov. 12-14, 2012.*

(Continued)

*Primary Examiner* — Ken N Vanderpuye
*Assistant Examiner* — Abbas H Alagheband
(74) *Attorney, Agent, or Firm* — Maschoff Brennan (57) ABSTRACT

A method of optical modulator calibration is disclosed. The method may include modulating, by an optical modulator, a received optical signal with a first electrical signal to generate a modulated optical signal, a polarity of data carried by the modulated optical signal, and an optical power of the modulated optical signal based on a temperature of the optical modulator. The method may also include monitoring the optical power of the modulated optical signal and in response to the optical power of the modulated optical signal being below or equal to a power threshold, adjusting the temperature of the optical modulator. In response to the optical power of the modulated optical signal being above the optical power threshold, the method may also include checking the polarity of the data carried by the modulated optical signal.

19 Claims, 8 Drawing Sheets

(56) References Cited

U.S. PATENT DOCUMENTS

| | | | |
|---|---|---|---|
| 2003/0103772 A1* | 6/2003 | Ishii | H04B 10/0779 398/197 |
| 2003/0175037 A1* | 9/2003 | Kimmitt | G02F 1/0123 398/198 |
| 2006/0083144 A1* | 4/2006 | Piede | G02F 1/025 369/100 |
| 2007/0058988 A1* | 3/2007 | Yonenaga | H04B 10/5051 398/186 |
| 2010/0200733 A1 | 8/2010 | McLaren et al. | |
| 2013/0109090 A1* | 5/2013 | Jaenisch | C12N 15/85 435/355 |
| 2013/0136388 A1* | 5/2013 | Uesaka | G02F 1/225 385/3 |
| 2013/0209090 A1* | 8/2013 | Rope | H04B 17/003 398/25 |

OTHER PUBLICATIONS

Padmaraju, K., Chan, J., Chen, L, Lipson, M., & Bergman, K. ( Sep. 2012). Thermal stabilization of a microring modulator using feedback control. Optics express, 20(27), 27999-28008.

Lentine, A.L.; Zortman, W.A.; Trotter, D.C.; Watts, M.R., "Active wavelength control of silicon microphotonic resonant modulators," Optical Interconnects Conference, 2012 IEEE , vol., No., pp. 46,47, May 20-23, 2012.

* cited by examiner

OPTICAL MODULATOR CALIBRATION

FIELD

The embodiments discussed herein are related to optical modulator calibration.

BACKGROUND

Electromagnetic beams, such as laser beams, are frequently used to transmit digital data, for example, in fiber-optic systems for long-distance telephone and internet communication. Consequently, optical technology plays a significant role in modern telecommunications and data communication. Examples of optical components used in such systems include optical or electromagnetic radiation sources such as light-emitting diodes and lasers, waveguides, fiber optics, lenses and other optics, photo-detectors and other optical sensors, optically-sensitive semiconductors, optical modulators, and others.

Systems making use of optical components often rely upon the precise manipulation of electromagnetic beams at specific wavelengths to accomplish a desired task. The wavelength of an electromagnetic beam may be disturbed by changes in a system, such as changes in electromagnetic energy, voltages and currents, temperature, among other changes. These changes may change the wavelength of the electromagnetic beams and render the system inoperable.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of optical modulator calibration is disclosed. The method may include modulating, by an optical modulator, a received optical signal with a first electrical signal to generate a modulated optical signal, a polarity of data carried by the modulated optical signal and an optical power of the modulated optical signal may be based on a temperature of the optical modulator. The method may also include monitoring the optical power of the modulated optical signal and in response to the optical power of the modulated optical signal being below or equal to an optical power threshold, adjusting the temperature of the optical modulator. In response to the optical power of the modulated optical signal being above the optical power threshold, the method may also include checking the polarity of the data carried by the modulated optical signal.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to an aspect of an embodiment, a system to calibrate optical modulators is disclosed. An optical modulator may modulate a received optical signal with a received electrical signal to generate a modulated optical signal. In some embodiments, the optical modulator and thus the system may be calibrated based on characteristics of the modulated optical signal. The characteristics of the modulated optical signal may depend on a relationship between a wavelength of the received optical signal and a resonant wavelength of the optical modulator. In particular, the optical power of the modulated optical signal and the polarity of data carried by the modulated optical signal may vary based on the relationship between the wavelength of the received optical signal and the resonant wavelength of the optical modulator. In some embodiments, the resonant wavelength of the optical modulator may vary based on temperature. In these and other embodiments, the system may adjust the temperature of the optical modulator to adjust the resonant wavelength of the optical modulator and thus the optical power of the modulated optical signal. After adjusting the temperature of the optical modulator, the system may compensate for the polarity of data carried by the modulated optical signal resulting from the temperature adjustment.

Embodiments of the present disclosure will be explained with reference to the accompanying drawings.

Figure 1A:
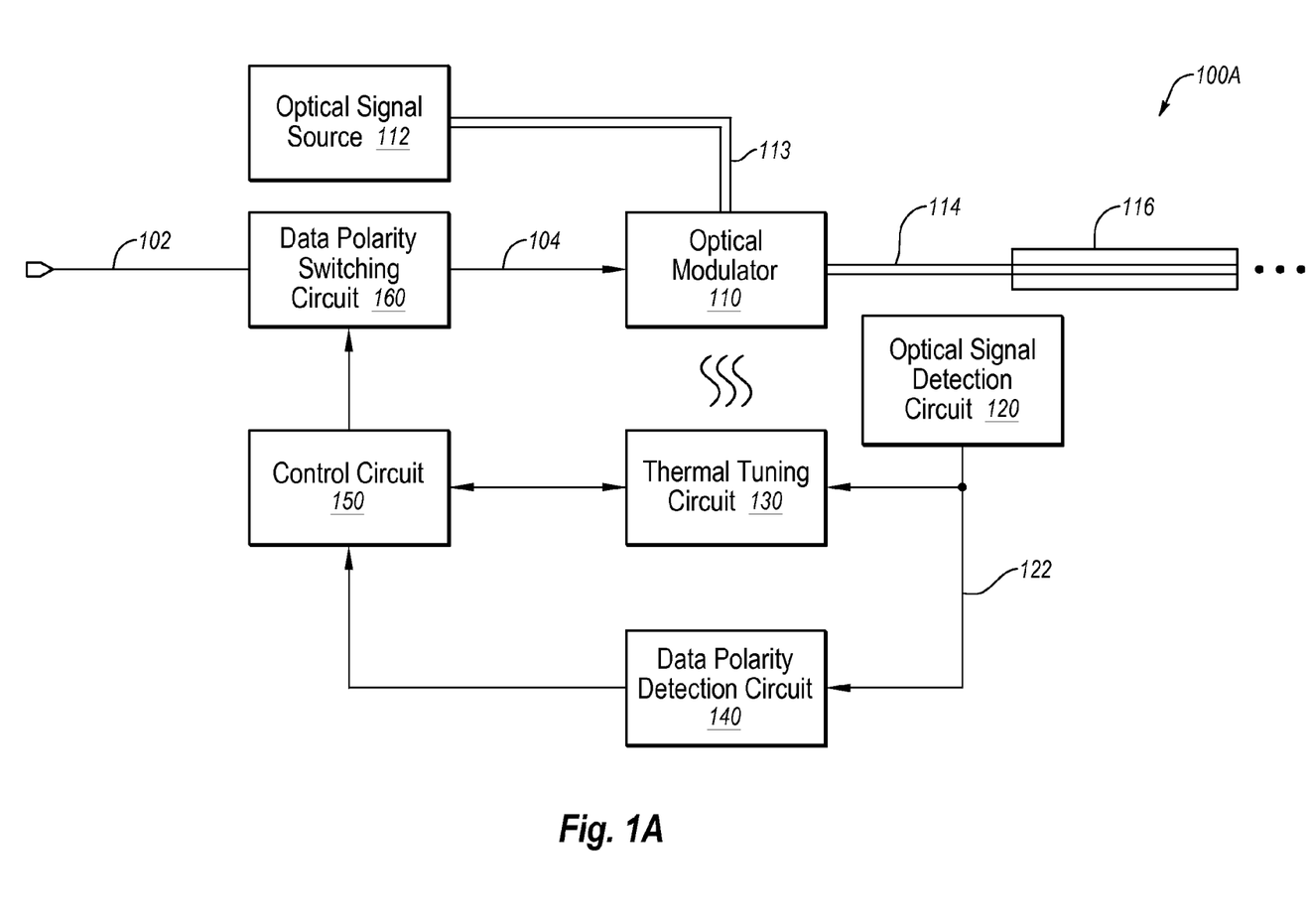
FIG. 1A illustrates an example system to calibrate optical modulators.

FIG. 1A illustrates an example system 100A to calibrate optical modulators, arranged in accordance with at least one embodiment described herein. The system 100A may include an optical modulator 110, an optical signal source 112, an optical signal detection circuit 120, a thermal tuning circuit 130, a data polarity detection circuit 140, a control circuit 150, and a data polarity switching circuit 160.

The optical signal source 112 may be coupled to the optical modulator 110. The optical signal source 112 may be configured to generate an optical signal 113 and to provide the optical signal 113 to the optical modulator 110. The optical signal source 112 may be or include a distributed feedback (DFB) laser, a distributed Bragg reflector (DBR) laser, a Fabry-Perot (FP) laser or other edge-emitting laser, a vertical cavity surface-emitting laser (VCSEL), or other suitable optical signal source.

The optical modulator 110 may be coupled to the optical signal source 112, to an optical waveguide 116, and to the data polarity switching circuit 160. The optical modulator 110 may be configured to receive a first electrical signal 104 and the optical signal 113 from the optical signal source 112. The first electrical signal 104 may include a data signal that includes data with a polarity.

The optical modulator 110 may modulate the optical signal 113 using the first electrical signal 104. For example, the optical modulator 110 may change a characteristic of the optical signal 113, such as a frequency, amplitude, polarization, or some other characteristic to modulate the optical signal 113 based on the first electrical signal 104 to generate a modulated optical signal 114. The modulated optical signal 114 may be modulated with the data carried by the first electrical signal 104. As a result, the modulated optical signal 114 may be configured to carry the data carried by the first electrical signal 104. The optical modulator 110 may output the modulated optical signal 114 to the optical waveguide 116. In these and other embodiments, the optical modulator 110 may include an optical modulator such as a Mach-Zehnder modulator, an electro-absorption modulator (EAM), an electro-optic modulator (EOM), or other optical modulator.

Figure 1B:
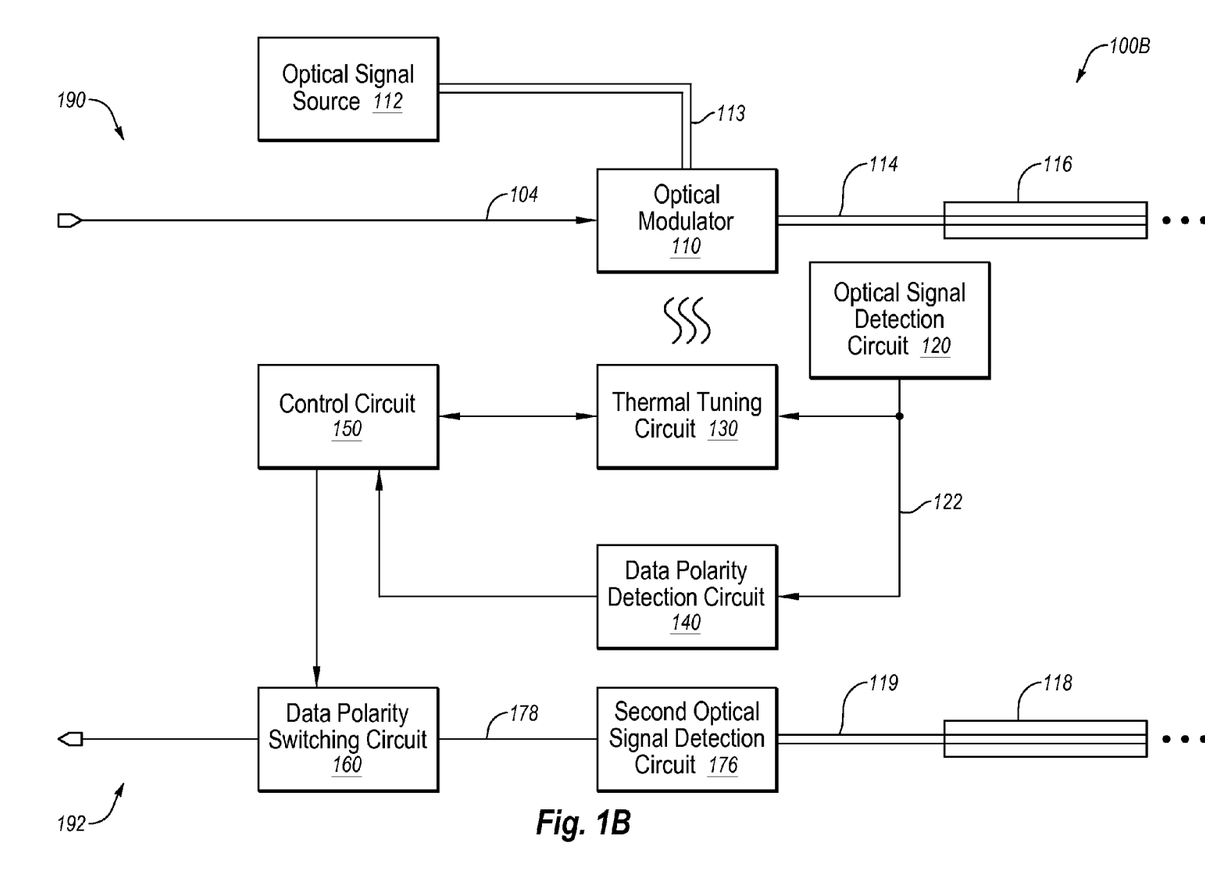
FIG. 1B illustrates another example system to calibrate optical modulators.
Figure 1C:
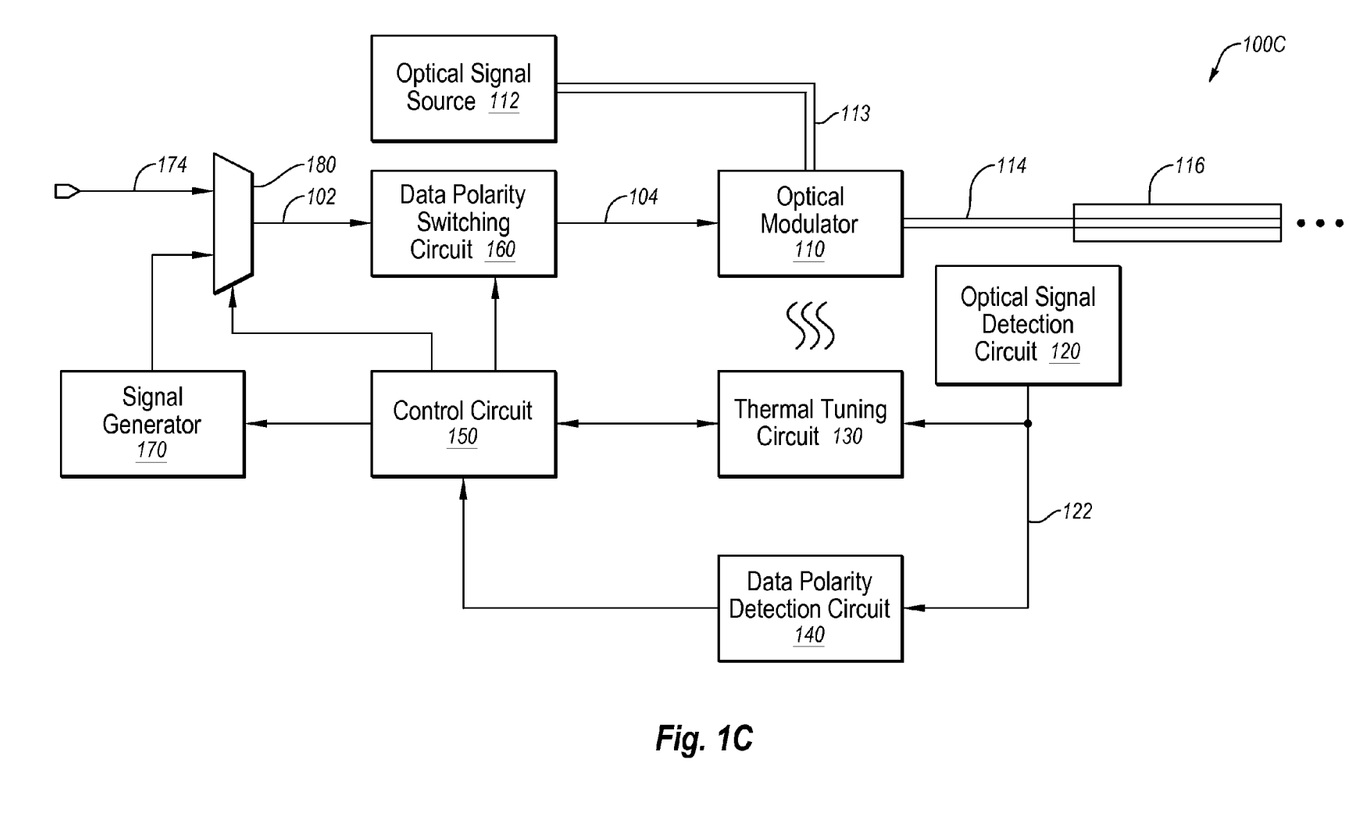
FIG. 1C illustrates another example system to calibrate optical modulators.
Figure 1D:
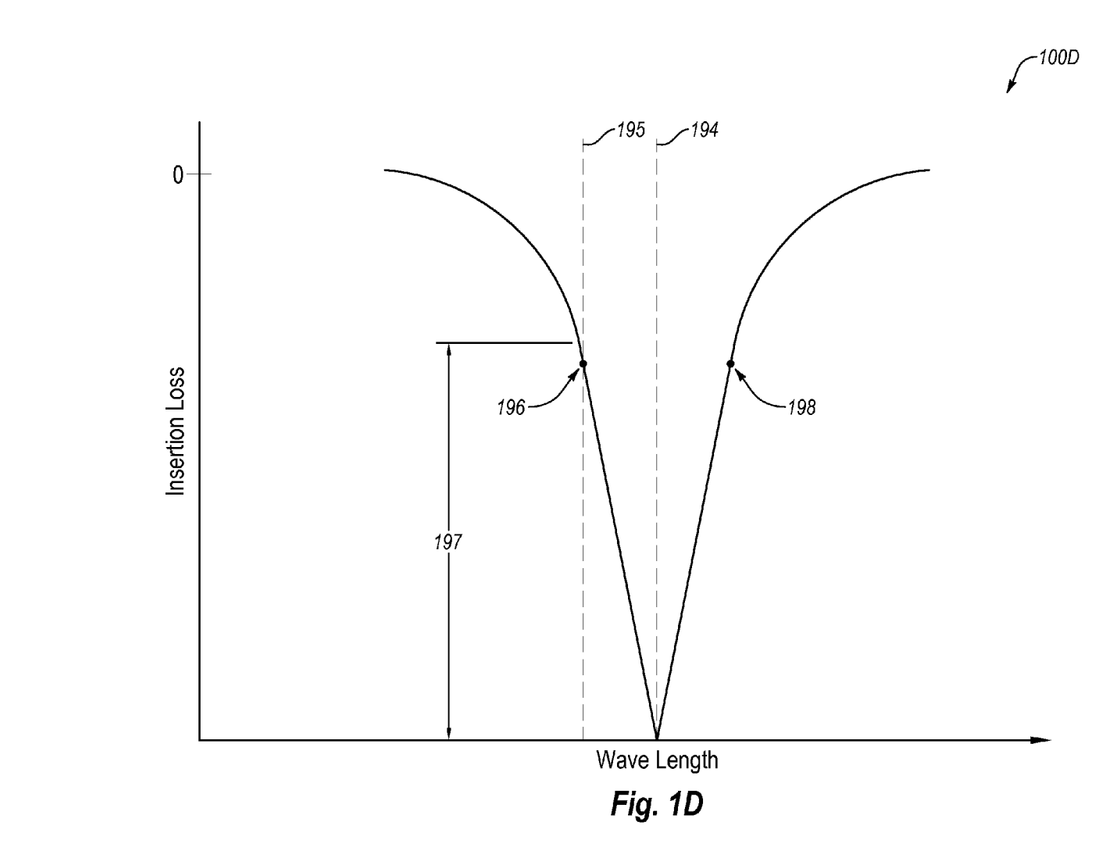
FIG. 1D illustrates a plot of insertion loss versus wavelength of an optical modulator.

FIG. 1D illustrates a plot 100D of insertion loss of the optical signal 113 versus a wavelength of the optical signal 113 with respect to a resonant wavelength 194 of the optical modulator 110, arranged in accordance with at least one embodiment described herein. During operation of the optical modulator 110, the resonant wavelength 194 of the optical modulator 110 may be tuned, e.g., adjusted, by adjusting a temperature of the optical modulator 110. In general, the resonant wavelength 194 of the optical modulator 110 may be tuned such that a wavelength 195 of the optical signal 113 crosses the plot 100D within a linear region 197 of the plot 100D. For example, the wavelength 195 is illustrated as crossing the plot 100D at a point 196, which is within the linear region 197. It may be determined that the wavelength of the optical signal 113 is within the linear region 197 based on an optical power of the modulated optical signal 114.

Furthermore, the polarity of the data carried by the modulated optical signal 114 may vary from the polarity of the data carried by the first electrical signal 104 based on whether the wavelength 195 of the optical signal 113 is greater or less than the resonant wavelength 194. For example, when the modulated optical signal 114 is modulated with data of a first polarity, when the wavelength 195 of the optical signal 113 is less than the resonant wavelength 194, the data carried by the modulated optical signal 114 may also have the first polarity. In contrast, when the wavelength 195 of the optical signal 113 is more than the resonant wavelength 194, the data carried by the modulated optical signal 114 may have a second polarity that is opposite from the first polarity. Data having opposite polarity may indicate that the polarity of each bit of the data may be changed to be the opposite polarity, e.g., a logical high bit may become a logical low bit and a logical low bit may become a logical high bit.

An example of data with different polarity follows. The data may include digital data and may be represented by logical high bits and logical low bits in the sequence 1011011 as carried by the first electrical signal 104. When the polarity of the data is not altered when carried by the modulated optical signal 114, the digital data may still be represented by the sequence 1011011. When the polarity of the digital data is changed to the opposite polarity when carried by the modulated optical signal 114, the digital data may be represented by the sequence 0100100. An unknown change in the polarity of the data may result in the system 100A not accurately communicating the data.

Due to the inverse Lorentzain type shape of the plot 100D, the plot 100D may have two points that result in the modulated optical signal 114 having approximately equal or equal optical power. For example, when the wavelength 195 of the optical signal 113 is aligned with the point 196 or a point 198 by tuning the resonant wavelength 194 of the optical modulator 110, the optical power of the modulated optical signal 114 may be approximately equal or equal. These two points 196 and 198, however, may be on opposite sides of the resonant wavelength 194. As a result, even though the optical power of the modulated optical signal 114 may be the same, the polarity of the data carried by the modulated optical signal 114 may change based on the relationship of the wavelength 195 of the optical signal 113 with the resonant wavelength 194 of the optical modulator 110. Thus, based on the optical power of the modulated optical signal 114, the system 100A may be unable to determine whether the polarity of the data carried by the modulated optical signal 114 has changed with respect to the polarity of the data carried by the first electrical signal 104.

Returning now to FIG. 1A, in general, it may be difficult to adjust the resonant wavelength of the optical modulator 110 with a small enough granularity such that a wavelength of the optical signal 113 is consistently or generally on one side of the resonant wavelength of the modulated optical signal 114. The system 100A may thus be configured to adjust the temperature of the optical modulator 110 until the optical power of the modulated optical signal 114 is at a desired level, e.g., above a threshold power level. After achieving a desired optical power for the modulated optical signal 114, the system 100A may check whether the polarity of the data carried by the modulated optical signal 114 has changed with respect to the polarity of the data carried by the first electrical signal 104. The system 100A may also be configured to compensate for the change in the polarity of the data carried by the modulated optical signal 114 without further tuning of the optical modulator 110. As a result, the system 100A may be able to generate the modulated optical signal 114 with less complexity in hardware and/or procedures than other systems that may more finely tune an optical modulator to achieve a desired data polarity and optical power. Alternately or additionally, the system 100A may be less expensive than other systems that may more finely tune an optical modulator to achieve a desired data polarity and optical power. In these and other embodiments, adjusting the temperature of the optical modulator 110 to achieve a desired optical power of the modulated optical signal 114 and compensating for the data polarity of the modulated optical signal 114 may be referred to herein as calibrating the optical modulator 110.

As illustrated in FIG. 1A, the optical signal detection circuit 120 may be coupled to the thermal tuning circuit 130 and the data polarity detection circuit 140. The optical signal detection circuit 120 may also be optically coupled to the optical modulator 110. The optical signal detection circuit 120 may be configured to generate a second electrical signal 122 based on the modulated optical signal 114. The second electrical signal 122 may include an electrical signal representation of the modulated optical signal 114. Accordingly, the second electrical signal 122 may be based on the optical power of the modulated optical signal 114. Furthermore, the second electrical signal 122 may carry the data carried by the modulated optical signal 114 and the data may have the same polarity as the data carried by the modulated optical signal 114. The optical signal detection circuit may provide the second electrical signal 122 to the thermal tuning circuit 130 and to the data polarity detection circuit 140. In some embodiments, the optical signal detection circuit 120 may include a photodiode. Alternately or additionally, the optical signal detection circuit 120 may include one or more other circuits, such as an amplifier or some other circuit or component to condition the second electrical signal 122.

The thermal tuning circuit 130 may be coupled to the control circuit 150 and the optical signal detection circuit 120. The thermal tuning circuit 130 may be configured to receive the second electrical signal 122. Using the second electrical signal 122, the thermal tuning circuit 130 may determine an optical power of the modulated optical signal 114. The thermal tuning circuit 130 may compare the determined optical power to a threshold optical power. When the optical power is less than or equal to a threshold optical power, the thermal tuning circuit 130 may generate or adjust the generation of heat to change the temperature of the optical modulator 110. In these and other embodiments, a component or a portion of the thermal tuning circuit 130 may be positioned to be thermally coupled to the optical modulator 110. The component or the portion of the thermal tuning circuit 130 being thermally coupled to the optical modulator 110 may indicate that the component or the portion of the thermal tuning circuit 130 is positioned in relation to the optical modulator 110 such that heat radiating from the component or the portion of the thermal tuning circuit 130 may directly affect the temperature of the optical modulator 110.

In some embodiments, the thermal tuning circuit 130 may include multiple components and may be digital, analog, or digital and analog. For example, in some embodiments, the thermal tuning circuit 130 may generate current based on the comparison of the optical power of the modulated optical signal 114 and the threshold optical power. The current may be sent to a resistor. The resistor may generate heat that may adjust the temperature of the optical modulator 110. By adjusting the temperature of the optical modulator 110, the resonant wavelength of the optical modulator 110 may be adjusted. Adjusting the resonant wavelength of the optical modulator 110 may adjust the optical power of the modulated optical signal 114. In this manner, the system 100A, and in particular, the optical modulator 110, the optical signal detection circuit 120, and the thermal tuning circuit 130 may be configured in a feedback loop configuration to adjust the resonant wavelength of the optical modulator 110 with respect to the optical power of the modulated optical signal 114.

When the determined optical power of the modulated optical signal 114 is greater than the threshold optical power, the thermal tuning circuit 130 may maintain a level of heat generation to maintain a temperature of the optical modulator 110. The thermal tuning circuit 130 may also indicate to the control circuit 150 that the optical power of the modulated optical signal 114 is greater than the threshold optical power.

The data polarity detection circuit 140 may be coupled to the control circuit 150 and the optical signal detection circuit 120. The data polarity detection circuit 140 may be configured to receive the second electrical signal 122 from the optical signal detection circuit 120. The data polarity detection circuit 140 may be further configured to determine if the polarity of the data carried by the modulated optical signal 114 is changed with respect to the polarity of the data carried by a third electrical signal 102. For example, the data polarity detection circuit 140 may include a bit error rate detection circuit. In these and other embodiments, a sequence of bits of the data carried by the first electrical signal 104 may be provided to the data polarity detection circuit 140. The data polarity detection circuit 140 may be configured to compare the bits of the data as carried by the first electrical signal 104 with the bits of data as carried by the second electrical signal 122. When a number of errors in the comparison of the second electrical signal 122 with the first electrical signal 104 are greater than a threshold, the data polarity detection circuit 140 may determine that the polarity of the data carried by the modulated optical signal 114 has changed. The data polarity detection circuit 140 may indicate to the control circuit 150 whether the polarity of the data carried by the modulated optical signal 114 has changed.

The data polarity switching circuit 160 may be coupled to the control circuit 150 and the optical modulator 110. The data polarity switching circuit 160 may be configured to receive the third electrical signal 102 and to output the first electrical signal 104 to the optical modulator 110. The data polarity switching circuit 160 may be configured to change a polarity of data carried by the third electrical signal 102 with respect to the polarity of data carried by the first electrical signal 104. The data polarity switching circuit 160 may switch the polarity of the data based on a signal from the control circuit 150. When the data polarity switching circuit 160 does not switch the polarity of the data, the data polarity switching circuit 160 may pass the third electrical signal 102 without changing the third electrical signal 102. In these and other embodiments, the third and first electrical signals 102 and 104 may be the same.

In some embodiments, the data polarity switching circuit 160 may include an inverter to change the polarity of the data in the third electrical signal 102. Alternately or additionally, when the third electrical signal 102 is a differential signal, the data polarity switching circuit 160 may switch the positive and negative signals of the differential signal. For example, the data polarity switching circuit 160 may switch the traces of the positive signal and the negative signal to change the polarity of the data carried by the third electrical signal 102.

The control circuit 150 may be coupled to the thermal tuning circuit 130, the data polarity detection circuit 140, and the data polarity switching circuit 160. The control circuit 150 may be configured to receive an indication from the thermal tuning circuit 130 when the optical power of the modulated optical signal 114 is above the optical power threshold. After the optical power of the modulated optical signal 114 is above the optical power threshold, the control circuit 150 may indicate to the data polarity detection circuit 140 to detect a change in the polarity of data of the modulated optical signal 114. Alternately or additionally, after the optical power of the modulated optical signal 114 is above the optical power threshold, the control circuit 150 may determine that signals from the data polarity detection circuit 140 indicating a change in the polarity of data are valid.

In some embodiments, after a particular duration of not receiving an indication of a data polarity change from the data polarity detection circuit 140, the control circuit 150 may determine that the polarity of the data is not being changed by the optical modulator 110. Alternately or additionally, the data polarity detection circuit 140 may indicate that a data polarity change has or has not occurred. In these and other embodiments, calibration of the optical modulator 110 may be completed and the optical modulator 110 may be used to transmit data along the optical waveguide 116 by way of the modulated optical signal 114.

When the control circuit 150 receives an indication that the data polarity has changed, the control circuit 150 may direct the data polarity switching circuit 160 to change the polarity of the data of the third electrical signal 102. As a result, the first electrical signal 104 may have data with a changed polarity. The optical modulator 110 may then modulate the optical signal 113 with the data with the changed polarity and change the polarity of the data again. As a result, the polarity of the data carried by the modulated optical signal 114 may be the same as the polarity of the data carried by the third electrical signal 102.

After the control circuit 150 directs the data polarity switching circuit 160 to change the polarity of the data of the third electrical signal 102, the control circuit 150 may wait to receive confirmation from the data polarity detection circuit 140 that the polarity of the data is changed. After receiving confirmation, the control circuit 150 may determine that the calibration of the optical modulator 110 may be completed. When confirmation is not received that the polarity of data is changed, e.g., a number of errors in the comparison of the second electrical signal 122 with the first electrical signal 104 is greater than a threshold, the control circuit 150 may determine that the data polarity detection circuit 140 is unable to properly extract the data from the second electrical signal 122. The data polarity detection circuit 140 may be unable to properly extract the data from the second electrical signal 122 because signal attenuation in the system 100A may cause the data to be lost. To compensate for the signal attenuation, the control circuit 150 may adjust the optical power threshold in the thermal tuning circuit 130. In these and other embodiments, the thermal tuning circuit 130 may then adjust the temperature of the optical modulator 110 to increase the optical power of the modulated optical signal 114. As a result, the second electrical signal 122 may be strong enough to allow the data polarity detection circuit 140 to properly extract the data from the second electrical signal 122. In these and other embodiments, the control circuit 150 may continue as previously indicated until the calibration of the system 100A is complete.

In some embodiments, after increasing the optical power threshold more than a particular number of times, the control circuit 150 may indicate that there is a problem associated with the system 100A.

In some embodiments, after the system 100A is calibrated, the thermal tuning circuit 130 may continue to monitor the optical power of the modulated optical signal 114. In these and other embodiments, when the optical power reduces below the threshold optical power, the thermal tuning circuit 130 may indicate the reduction in optical power to the control circuit 150 and the system 100A may recalibrate the optical modulator 110. Other modifications, additions, or omissions may be made to the system 100A without departing from the scope of the present disclosure.

FIG. 1B illustrates another example system 100B to calibrate optical modulators, arranged in accordance with at least one embodiment described herein. The system 100B may include the optical modulator 110, the optical signal source 112, the optical signal detection circuit 120, the thermal tuning circuit 130, the data polarity detection circuit 140, the control circuit 150, the data polarity switching circuit 160, and a second optical signal detection circuit 176.

The system 100B may further include a data transmission path 190 and a data reception path 192. The data transmission path 190 may include the optical modulator 110. In these and other embodiments, data carried by the first electrical signal 104 may be used to modulate the modulated optical signal 114. The modulated optical signal 114 may be transmitted through the optical waveguide 116. Thus, the data transmission path 190 may be used to transmit data through the optical waveguide 116.

The data reception path 192 may include a second optical waveguide 118, the second optical signal detection circuit 176, and the data polarity switching circuit 160. A second modulated optical signal 119 may be received through the second optical waveguide 118. The second optical waveguide 118 may provide the second modulated optical signal 119 to the second optical signal detection circuit 176.

The second optical signal detection circuit 176 may be configured to generate a fourth electrical signal 178 based on the second modulated optical signal 119. The fourth electrical signal 178 may include an electrical signal representation of the second modulated optical signal 119. In some embodiments, the second optical signal detection circuit 176 may include a photodiode. Alternately or additionally, the second optical signal detection circuit 176 may include one or more other circuits, such as an amplifier or some other circuit or component to condition the fourth electrical signal 178.

The fourth electrical signal 178 may be provided to the data polarity switching circuit 160. As described with respect to FIG. 1A, the data polarity switching circuit 160 may switch the polarity of the data of the fourth electrical signal 178 based on the polarity of the data of the first electrical signal 104 and the polarity of the data of the modulated optical signal 114 not being the same. By switching the polarity of the fourth electrical signal 178 when the polarity of the data of the first electrical signal 104 and the polarity of the data of the modulated optical signal 114 are not the same, the system 100B may be configured to provide data to a data-providing system coupled to the system 100B that has the same polarity as data received from the data-providing system. For example, a data-providing system, such as a processor, may provide the first electrical signal 104 to the system 100B. The first electrical signal 104 may include data with a first polarity. The data may have a second polarity when it is carried by the modulated optical signal 114. The data carried by the second modulated optical signal 119 when received by the system 100B may have the second polarity. To align the polarity of the data of the fourth electrical signal 178 with the polarity of the first electrical signal 104 as expected by the data-providing system, the data polarity switching circuit 160 may switch the polarity of the data in the fourth electrical signal 178 before sending the fourth electrical signal 178 to the data-providing system. Modifications, additions, or omissions may be made to the system 100B without departing from the scope of the present disclosure.

FIG. 1C illustrates another example system 100C to calibrate optical modulators, arranged in accordance with at least one embodiment described herein. The system 100C may include the optical modulator 110, the optical signal source 112, the optical signal detection circuit 120, the thermal tuning circuit 130, the data polarity detection circuit 140, the control circuit 150, and the data polarity switching circuit 160 arranged as illustrated in FIG. 1A. The system 100C may further include a signal generator 170 and a multiplexer 180.

The signal generator 170 may be coupled to the control circuit 150 and the multiplexer 180. The multiplexer 180 may be coupled to the data polarity switching circuit 160, the signal generator 170, and the control circuit 150.

The signal generator 170 may be configured to generate multiple different types of signals. For example, the signal generator 170 may generate a first generated electrical signal that consistently oscillates between a high and a low level and a second generated electrical signal that randomly oscillates between a high and a low level. The signal generator 170 may determine which of the first and second generated electrical signals to generate as directed by the control circuit 150.

The multiplexer 180 may be configured to provide either a fifth electrical signal 174 or the first and second generated electrical signals as the third electrical signal 102 to the data polarity switching circuit 160 as directed by the control circuit 150.

In these and other embodiments, the control circuit 150 may direct the signal generator 170 to generate the first generated electrical signal and direct the multiplexer 180 to provide the first generated electrical signal to the data polarity switching circuit 160 when the optical power of the modulated optical signal 114 is less than or equal to the threshold optical power. In these and other embodiments, a signal that consistently oscillates between a high and a low level may assist the thermal tuning circuit 130 to more rapidly determine an optical power of the modulated optical signal 114 as compared to a signal that randomly oscillates between a high and a low level.

After the optical power of the modulated optical signal 114 is more than the threshold optical power, the control circuit 150 may direct the signal generator 170 to generate the second generated electrical signal and direct the multiplexer 180 to provide the second generated electrical signal to the data polarity switching circuit 160. In these and other embodiments, a signal that randomly oscillates between a high and a low level may assist the data polarity detection circuit 140 to more rapidly determine if the polarity of the data carried by the modulated optical signal 114 is changed with respect to the polarity of the data carried by the first electrical signal 104 as compared to a signal that consistently oscillates between a high and a low level.

After the calibration of the system 100C, the control circuit 150 may direct the multiplexer 180 to provide the fifth electrical signal 174 to the data polarity switching circuit 160. In these and other embodiments, the fifth electrical signal 174 may include a signal that is provided to the system 100C from another system, such as a processor, for transmission through the optical waveguide 116. Modifications, additions, or omissions may be made to the system 100C without departing from the scope of the present disclosure.

Figure 2:
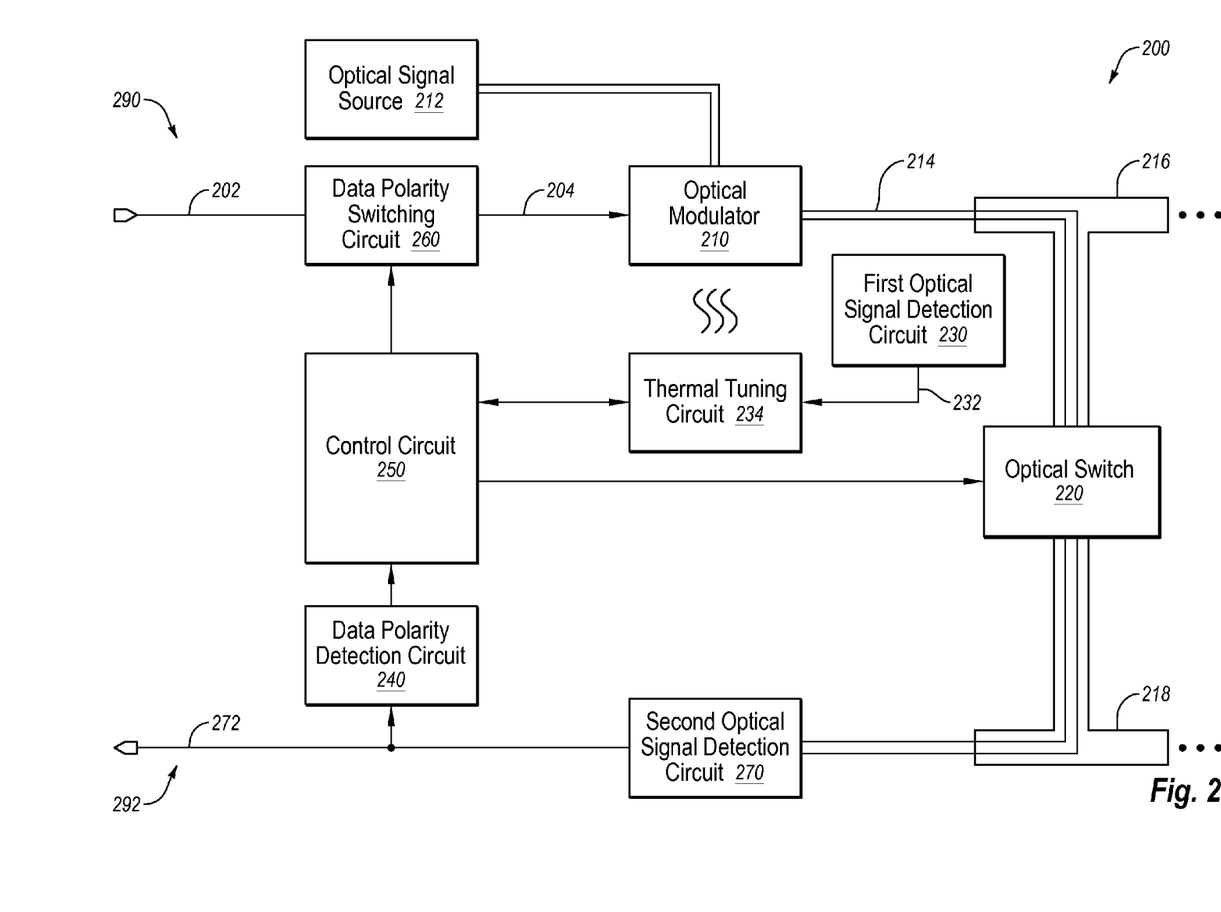
FIG. 2 illustrates another example system to calibrate optical modulators.

FIG. 2 illustrates another example system 200 to calibrate optical modulators, arranged in accordance with at least one embodiment described herein. The system 200 may include an optical modulator 210, an optical signal source 212, an optical switch 220, a first optical signal detection circuit 230, a thermal tuning circuit 234, a data polarity detection circuit 240, a control circuit 250, a data polarity switching circuit 260, and a second optical signal detection circuit 270.

The optical modulator 210, the optical signal source 212, the first optical signal detection circuit 230, the thermal tuning circuit 234, the control circuit 250, and the data polarity switching circuit 260 may be analogous to the optical modulator 110, the optical signal source 112, the optical signal detection circuit 120, the thermal tuning circuit 130, the control circuit 150, and the data polarity switching circuit 160 of the systems 100A, 100B, and/or 100C of FIGS. 1A, 1B, and 1C. Accordingly, no further detailed description of these circuits is provided with respect to FIG. 2.

As illustrated in FIG. 2, the optical modulator 210 may output a modulated optical signal 214 that may carry the data carried by a first electrical signal 204 received by the optical modulator 210. The modulated optical signal 214 may be transmitted through a first optical waveguide 216. The first optical waveguide 216 may be included in a data transmission path 290 of the system 200. The first optical waveguide 216 may be optically coupled to a second optical waveguide 218 in a data reception path 292 of the system 200 by the optical switch 220.

The optical switch 220 may be controlled by the control circuit 250. During the calibration of the optical modulator 210, the control circuit 250 may direct the optical switch 220 to close and optically couple the first and second optical waveguides 216 and 218 such that the modulated optical signal 214 may pass from the first optical waveguide 216 to the second optical waveguide 218. When the optical switch 220 is open, the optical switch 220 may optically disconnect the first and second optical waveguides 216 and 218.

The second optical signal detection circuit 270 may be optically coupled with the second optical waveguide 218 and may be coupled with the data polarity detection circuit 240. The second optical signal detection circuit 270 may be configured to generate a second electrical signal 272 based on the modulated optical signal 214. The second electrical signal 272 may include an electrical signal representation of the modulated optical signal 214. As such, the second electrical signal 272 may carry the data carried by the modulated optical signal 214 and the data may have the same polarity as the data carried by the modulated optical signal 214.

In some embodiments, the second optical signal detection circuit 270 may include a photodiode. Alternately or additionally, the second optical signal detection circuit 270 may include one or more other circuits, such as an amplifier or some other circuit or component to condition the second electrical signal 272. The second optical signal detection circuit 270 may provide the second electrical signal 272 to the data polarity detection circuit 240.

The data polarity detection circuit 240 may be similar to the data polarity detection circuit 140 of FIGS. 1A, 1B, and 1C, except the data polarity detection circuit 240 may receive the second electrical signal 272 from the second optical signal detection circuit 270 instead of the first optical signal detection circuit 230. As illustrated in FIG. 2, the first optical signal detection circuit 230 may be configured to generate a third electrical signal 232 that the thermal tuning circuit 234 may use as a basis to adjust the temperature of the optical modulator 210.

An example of how the system 200 may be used to calibrate the optical modulator 210 follows. The optical switch 220 may be open while the thermal tuning circuit 234 adjusts the temperature of the optical modulator 210 until the optical power of the modulated optical signal 214 is above the optical power threshold based on the third electrical signal 232. After the optical power of the modulated optical signal 214 is above the optical power threshold, the control circuit 250 may direct the optical switch 220 to close. The modulated optical signal 214 may travel to the second optical waveguide 218. The second optical signal detection circuit 270 may generate the second electrical signal 272 based on the modulated optical signal 214. The data polarity detection circuit 240 may determine if the polarity of the data of the modulated optical signal 214 is changed with respect to the polarity of the data carried by a fourth electrical signal 202 that is received by the data polarity switching circuit 260.

If the polarity of the data of the modulated optical signal 214 is not changed, the control circuit 250 may open the optical switch 220 and the calibration of the optical modulator 210 may be complete. If the polarity of the data of the modulated optical signal 214 is changed, the control circuit 250 may direct the data polarity switching circuit 260 to change the polarity of the data of the received fourth electrical signal 202 such that the first electrical signal 204 received by the optical modulator 210 has a changed polarity.

When the data polarity detection circuit 240 is unable to properly extract the data from the second electrical signal 275 because of signal attenuation in the system 200. The optical power threshold in the thermal tuning circuit 234 may be adjusted and the system 200 may continue calibration.

After calibration of the optical modulator 210, the control circuit 250 may direct the optical switch 220 to open. After the optical switch 220 is open, the system 200 may be used to transmit data along the data transmission path 290 and to receive data along the data reception path 292.

Modifications, additions, or omissions may be made to the system 200 without departing from the scope of the present disclosure. For example, in some embodiments, the data polarity switching circuit 260 may be located in the data reception path 292 instead of the data transmission path 290. Alternately or additionally, the system 200 may include a signal generator and a multiplexer analogous to the signal generator 170 and the multiplexer 180 of FIG. 1C.

Figure 3:
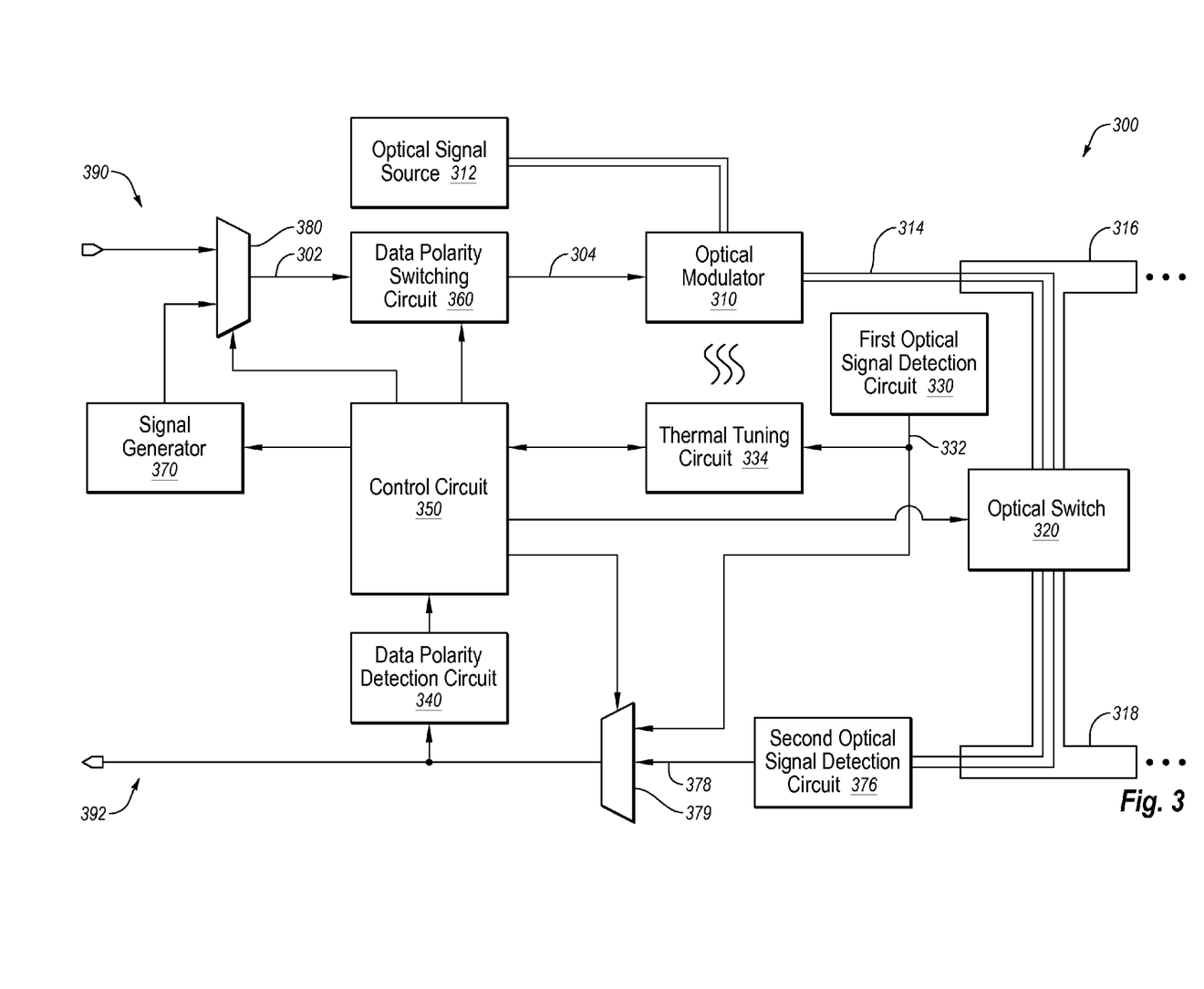
FIG. 3 illustrates another example system to calibrate optical modulators.

FIG. 3 illustrates another example system 300 to calibrate optical modulators, arranged in accordance with at least one embodiment described herein. The system 300 may include an optical modulator 310, an optical signal source 312, a first optical waveguide 316, an optical switch 320, a first optical signal detection circuit 330, a thermal tuning circuit 334, a data polarity detection circuit 340, a control circuit 350, a data polarity switching circuit 360, a signal generator 370, a first multiplexer 380, a second optical signal detection circuit 376, and a second multiplexer 379.

The optical modulator 310, the optical signal source 312, the first optical signal detection circuit 330, the thermal tuning circuit 334, the data polarity detection circuit 340, the control circuit 350, and the data polarity switching circuit 360, may be analogous to the optical modulators 110 and 210, the optical signal sources 112 and 212, the optical signal detection circuits 120 and 230, the thermal tuning circuits 130 and 234, the control circuits 150 and 250, and the data polarity switching circuits 160 and 260 of the systems 100A, 100B, 100C, and/or 200 of FIGS. 1A, 1B, 1C, and 2. The optical switch 320 may be analogous to the optical switch 220 of FIG. 2. The second optical signal detection circuit 376 may be analogous to the second optical signal detection circuits 176 and 270 of FIGS. 1B and 2. The signal generator 370 and the first multiplexer 380 may be analogous to the signal generator 170 and the multiplexer 180 of FIG. 1C. Accordingly, no further detailed description of these circuits and/or components is provided with respect to FIG. 3.

As illustrated in FIG. 3, the optical modulator 310 may output a modulated optical signal 314 that may carry the data carried by a first electrical signal 304 received by the optical modulator 310. The modulated optical signal 314 may be transmitted through the first optical waveguide 316. The first optical waveguide 316 may be in a data transmission path 390 of the system 300. The first optical waveguide 316 may be optically coupled to a second optical waveguide 318 in a data reception path 392 of the system 300 by the optical switch 320.

The first optical signal detection circuit 330 may also be optically coupled to the optical modulator 310. The first optical signal detection circuit 330 may be configured to generate a second electrical signal 332 based on the modulated optical signal 314. The second electrical signal 332 may include an electrical signal representation of the modulated optical signal 314 and may be provided to the thermal tuning circuit 334 and to the second multiplexer 379. The thermal tuning circuit 334 may adjust the temperature of the optical modulator 310 based on the second electrical signal 332.

The second optical signal detection circuit 376 may be optically coupled with the second optical waveguide 318 and may be coupled with the second multiplexer 379. The second optical signal detection circuit 376 may be configured to generate a third electrical signal 378 based on the modulated optical signal 314 and to provide the third electrical signal 378 to the second multiplexer 379. The third electrical signal 378 may include an electrical signal representation of the modulated optical signal 314. As such, the third electrical signal 378 may carry the data carried by the modulated optical signal 314 and the data may have the same polarity as the data carried by the modulated optical signal 314.

The second multiplexer 379 may be coupled to the first and second optical signal detection circuit 376, the control circuit 350, and the data polarity detection circuit 340. Based on a selection signal received from the control circuit 350, the second multiplexer 379 may be configured to select either the second electrical signal 332 or the third electrical signal 378 for providing to the data polarity detection circuit 340.

The data polarity detection circuit 340 may be similar to the data polarity detection circuits 140 and 240 of FIGS. 1A, 1B, 1C, and 2, except the data polarity detection circuit 340 may receive the selected one of the second electrical signal 332 or the third electrical signal 378 from the second multiplexer 379 instead of from the first optical signal detection circuit 330 or the second optical signal detection circuit 376.

An example of how the system 300 may be used to calibrate the optical modulator 310 follows. The signal generator 370 may generate a first generated electrical signal that consistently oscillates between a high and a low level. The first generated electrical signal may be provided by the first multiplexer 380 to the optical modulator 310 by way of the data polarity switching circuit 360. In these and other embodiments, a fourth electrical signal 302 received by the data polarity switching circuit 360 and the first electrical signal 304 and may include the second generated electrical signal. The optical modulator 310 may generate the modulated optical signal 314 based on the first generated electrical signal.

The first optical signal detection circuit 330 may generate the second electrical signal 332 based on the modulated optical signal 314. The optical switch 320 may be open while the thermal tuning circuit 334 adjusts the temperature of the optical modulator 310 until the optical power of the modulated optical signal 314 is above the optical power threshold based on the second electrical signal 332. After the optical power of the modulated optical signal 314 is above the optical power threshold, the control circuit 350 may direct the signal generator 370 to generate a second generated electrical signal that randomly oscillates between a high and a low level. The second generated electrical signal may be provided by the first multiplexer 380 to the optical modulator 310 by way of the data polarity switching circuit 360. In these and other embodiments, the first electrical signal 304 and the fourth electrical signal 302 may include the second generated electrical signal. The optical modulator 310 may generate the modulated optical signal 314 based on the second generated electrical signal.

After the modulated optical signal 314 is generated based on the second generated electrical signal, the control circuit 350 may also direct the optical switch 320 to close. The modulated optical signal 314 may travel to the second optical waveguide 318. The second optical signal detection circuit 376 may generate the third electrical signal 378 based on the modulated optical signal 314.

The second multiplexer 379 may receive the second and third electrical signals 332 and 378. Based on the selection signal from the control circuit 350, the second multiplexer 379 may select one of the second and third electrical signals 332 and 378 and may provide the selected one of the second and third electrical signals 332 and 378 to the data polarity detection circuit 340.

The data polarity detection circuit 340 may determine if the polarity of the data of the modulated optical signal 314 is changed with respect to the polarity of the data carried by the fourth electrical signal 302 received by the data polarity switching circuit 360.

If the polarity of the data of the modulated optical signal 314 is not changed, the control circuit 350 may open the optical switch 320 and direct the second multiplexer 379 to select the third electrical signal 378 from the second optical signal detection circuit 376. The calibration of the optical modulator 310 may then be complete. If the polarity of the data of the modulated optical signal 314 is changed, the control circuit 350 may direct the data polarity switching circuit 360 to change the polarity of the data of the received fourth electrical signal 302 such that the first electrical signal 304 received by the optical modulator 310 has a changed polarity.

When the data polarity detection circuit 340 is unable to properly extract the data from the selected one of the second and third electrical signals 332 and 378 because of signal attenuation in the system 300, the optical power threshold in the thermal tuning circuit 334 may be adjusted. In some embodiments, the control circuit 350 may direct the second multiplexer 379 to select the other of the second and third electrical signals 332 and 378 to provide to the data polarity detection circuit 340. The calibration of the system 300 may then continue.

Modifications, additions, or omissions may be made to the system 300 without departing from the scope of the present disclosure. For example, in some embodiments, the data polarity switching circuit 360 may be located in the data reception path 392 instead of the data transmission path 390. Alternately or additionally, the system 300 may not include the optical switch 320. In these and other embodiments, the second electrical signal 332 may be provided to the data polarity detection circuit 340 along the data reception path 392 by way of the second multiplexer 379.

Figure 4:
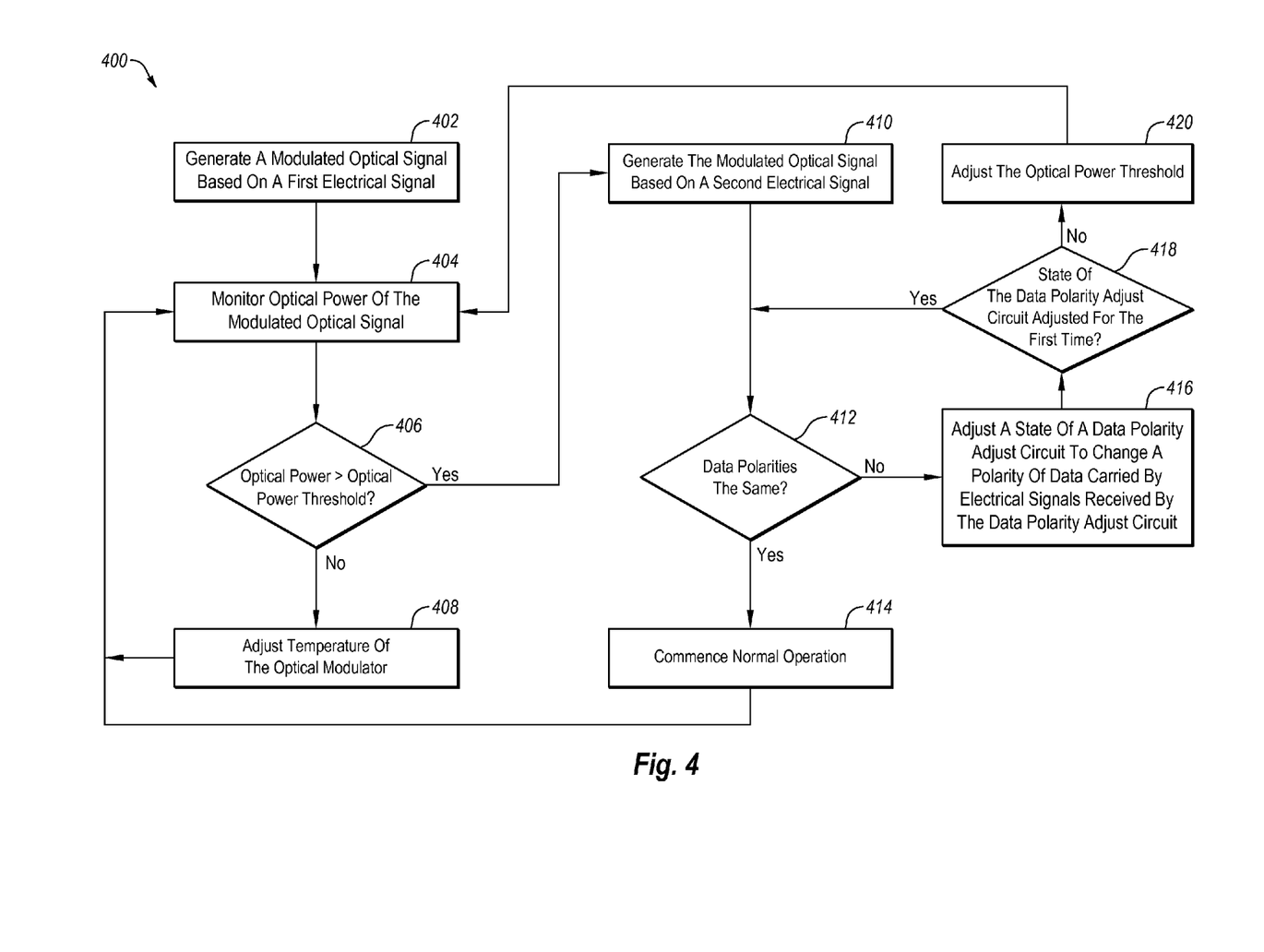
FIG. 4 is a flowchart of an example method of optical modulator calibration.

FIG. 4 is a flowchart of an example method 400 of optical modulator calibration, arranged in accordance with at least one embodiment described herein. The method 400 may be implemented, in some embodiments, by a system to calibrate optical modulators, such as the systems 100A, 100B, 100C, 200, and/or 300 of FIGS. 1A, 1B, 1C, 2, and 3. Although illustrated as discrete blocks, various blocks may be divided into additional blocks, combined into fewer blocks, or eliminated, depending on the desired implementation.

The method 400 may begin at block 402, where a modulated optical signal may be generated by an optical modulator based on a first electrical signal. In some embodiments, the first electrical signal may include a signal that consistently oscillates between a high and a low level.

In block 404, the optical power of the modulated optical signal may be monitored. The optical power of the modulated optical signal may be monitored by converting the modulated optical signal to an electrical signal and monitoring characteristics of the electrical signal that correspond to the optical power of the modulated optical signal.

In block 406, it may be determined when the optical power of the modulated optical signal is greater than a threshold optical power. When the optical power of the modulated optical signal is greater than the threshold optical power, the method 400 may proceed to block 410. When the optical power of the modulated optical signal is not greater than the threshold optical power, the method 400 may proceed to block 408.

In block 408, the temperature of the optical modulator may be adjusted. Adjusting the temperature of the optical modulator may adjust the resonant wavelength of the optical modulator. Adjusting the resonant wavelength of the optical modulator may result in the optical power of the modulated optical signal being adjusted. The method 400 may proceed to block 404.

In block 410, the modulated optical signal may be generated by an optical modulator based on a second electrical signal. In some embodiments, the second electrical signal may include a signal that randomly oscillates between a high and a low level.

In block 412, it may be determined if the data polarity of the modulated optical signal is the same as the data polarity of the second electrical signal. When the data polarity of the modulated optical signal is the same as the data polarity of the second electrical signal, the method 400 may proceed to block 414. When the data polarity of the modulated optical signal is not the same as the data polarity of the second electrical signal, the method 400 may proceed to block 416.

In block 414, normal operation of the optical modulator may begin. In some embodiments, during normal operation, the optical power of modulated optical signals generated using data signals for transmission may be monitored. In these and other embodiments, the method 400 may proceed to block 404.

In block 416, a state of a data polarity adjust circuit may be adjusted to change a polarity of data carried by electrical signals received by the data polarity adjust circuit. In some embodiments, the polarity of data of electrical signals provided to the optical modulator may be adjusted by the data polarity adjust circuit. Alternately or additionally, the polarity of data carried by the electrical signals provided to the optical modulator may be electrical signals in a different transmission path than the optical modulator.

In block 418, it may be determined if the state of the data polarity adjust circuit is being adjusted for the first time. When the state of the data polarity adjust circuit is not being adjusted for the first time, the method 400 may proceed to block 420. When the state of the data polarity adjust circuit is being adjusted for the first time, the method 400 may proceed to block 412.

In block 420, the optical power threshold may be adjusted. In particular, the optical power threshold may be increased. In some embodiments, increasing the optical power threshold may result in an increased signal-to-noise ratio of the modulated optical signal. The method 400 may proceed to block 404.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
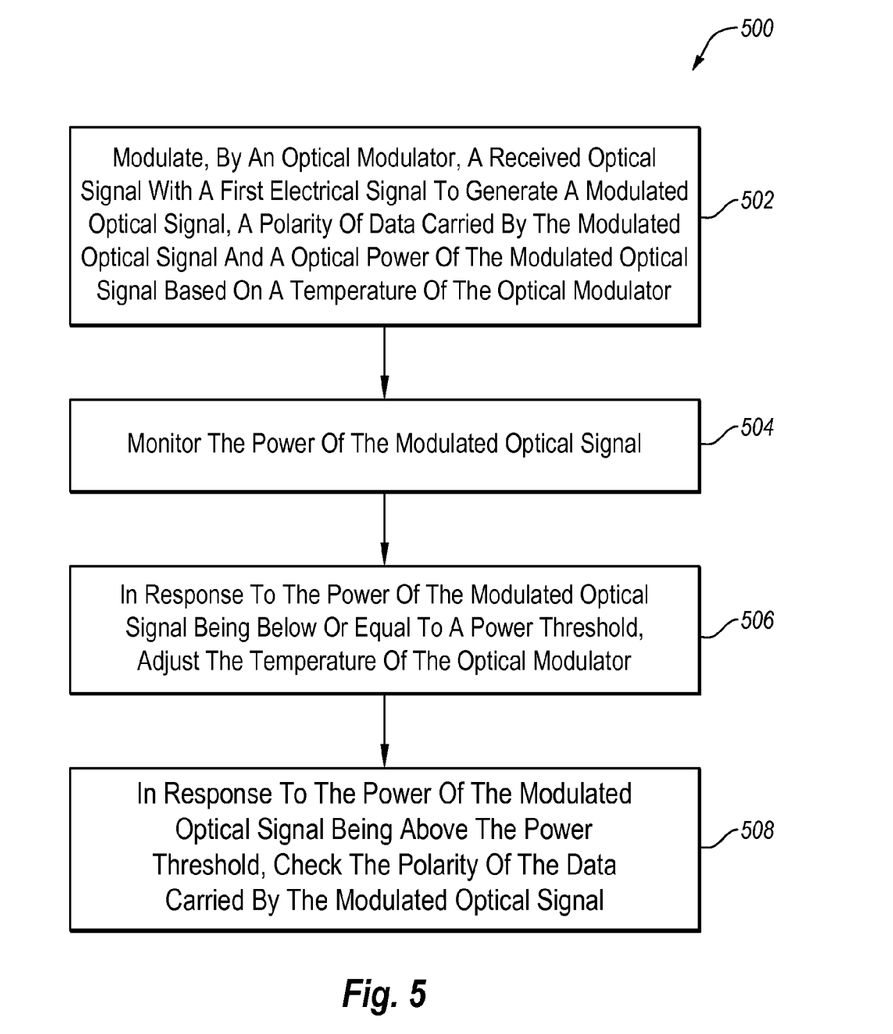
FIG. 5 is a flowchart of another example method of optical modulator calibration.

FIG. 5 is a flowchart of another example method 500 of optical modulator calibration, arranged in accordance with at least one embodiment described herein. The method 500 may be implemented, in some embodiments, by a system to calibrate optical modulators, such as the systems 100A, 100B, 100C, 200, and/or 300 of FIGS. 1A, 1B, 1C, 2, and 3. Although illustrated as discrete blocks, various blocks may be divided into additional blocks, combined into fewer blocks, or eliminated, depending on the desired implementation.

The method 500 may begin at block 502, where a received optical signal may be modulated, by an optical modulator, with a first electrical signal to generate a modulated optical signal. A polarity of data carried by the modulated optical signal and a power of the modulated optical signal may be based on a temperature of the optical modulator.

In block 504, the optical power of the modulated optical signal may be monitored. In block 506, in response to the optical power of the modulated optical signal being below or equal to a power threshold, the temperature of the optical modulator may be adjusted.

In block 508, in response to the optical power of the modulated optical signal being above the optical power threshold, the polarity of the data carried by the modulated optical signal may be checked.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 500 may further include in response to the optical power of the modulated optical signal being above the optical power threshold, modulating the received optical signal with a second electrical signal to generate a second modulated optical signal. In these and other embodiments, the polarity of the data carried by the second modulated optical signal may be checked. In these and other embodiments, the first electrical signal may consistently oscillate between a high and a low level and the second electrical signal may randomly oscillate between the high and the low level.

In some embodiments, the method 500 may further include generating a second electrical signal based on the modulated optical signal. In these and other embodiments, the optical power of the modulated optical signal may be monitored by monitoring power of the second electrical signal and the polarity of the data carried by the modulated optical signal may be checked by checking a polarity of data carried by the second electrical signal.

In some embodiments, the method 500 may further include generating a second electrical signal based on the modulated optical signal using a first signal detection circuit. In these and other embodiments, the optical power of the modulated optical signal may be monitored by monitoring power of the second electrical signal. The method 500 may further include generating a third electrical signal based on the modulated optical signal using a second signal detection circuit. In these and other embodiments, the polarity of the data carried by the modulated optical signal may be checked by checking a polarity of data carried by the third electrical signal.

In some embodiments, the method 500 may further include adjusting a state of a data polarity adjust circuit to change a polarity of data of electrical signals received by the data polarity adjust circuit in response to the polarity of the data carried by the modulated optical signal being different from a polarity of data carried by the first electrical signal. In these and other embodiments, the received optical signal may be modulated in a data transmission path of a system and the data polarity adjust circuit may be included in a data reception path of the system.

In these and other embodiments, the method 500 may further include changing the data polarity of the first electrical signal using the data polarity adjust circuit in response to the polarity of the data carried by the modulated optical signal being different from a polarity of data carried by the first electrical signal.

In these and other embodiments, the method 500 may further include continuing to monitor the optical power of the modulated optical signal and in response to the optical power of the modulated optical signal being below or equal to the optical power threshold, re-adjusting the temperature of the optical modulator. Alternately or additionally, the method 500 may further include re-checking the polarity of the data carried by the modulated optical signal; and in response to the polarity of the data carried by the modulated optical signal being different from a polarity of data carried by the first electrical signal. In these and other embodiments, the method 500 may further include increasing the optical power threshold and performing the previous acts of the method 500. For example, the previous acts that may be performed may include monitoring the optical power of the modulated optical signal and in response to the optical power of the modulated optical signal being below or equal to a power threshold, adjusting the temperature of the optical modulator. The previous acts may further include in response to the optical power of the modulated optical signal being above the optical power threshold, checking the polarity of the data carried by the modulated optical signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

All examples and conditional language recited herein are intended as pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A system to calibrate optical modulators, the system comprising:
   an optical modulator configured to output a modulated optical signal based on a first electrical signal, an optical power of and a polarity of data carried by the modulated optical signal being dependent on a temperature of the optical modulator;
   an optical signal detection circuit optically coupled to the optical modulator and configured to generate a second electrical signal based on the optical power of the modulated optical signal;
   a thermal tuning circuit coupled to the optical signal detection circuit and configured to adjust the temperature of the optical modulator in response to a power of the second electrical signal being less than a particular power threshold;
   a data polarity detection circuit configured to compare the polarity of the data carried by the modulated optical signal with a polarity of data carried by the first electrical signal;
   a data polarity switching circuit configured to switch the polarity of data carried by a third electrical signal in the system in response to the polarity of the data carried by the modulated optical signal being opposite from the polarity of the data carried by the first electrical signal; and
   a signal generator circuit configured to adjust a data pattern of the data of the first electrical signal, the signal generator circuit configured to generate a first data pattern with an approximately fifty percent duty-cycle that oscillates between a high level and a low level and to generate a second data pattern that randomly oscillates between the high level and the low level, wherein the data polarity detection circuit is configured to detect the polarity of the data carried by the modulated optical signal when the data of the first electrical signal follows the first data pattern and the thermal tuning circuit is configured to adjust the temperature of the optical modulator when the data of the first electrical signal follows the second data pattern.

2. The system of claim 1, wherein the system includes a data transmission path that includes the optical signal detection circuit and a data reception path that includes the data polarity detection circuit.

3. The system of claim 2, wherein the data polarity switching circuit is included in the data transmission path such that an output of the data polarity switching circuit includes the first electrical signal provided to the optical modulator.

4. The system of claim 2, wherein the data polarity switching circuit is included in the data reception path.

5. The system of claim 2, wherein the optical signal detection circuit is a first optical signal detection circuit, wherein the system further comprises:
a first waveguide optically coupled to the optical modulator and configured to receive the modulated optical signal;
a second waveguide;
a second optical signal detection circuit in the data reception path and optically coupled to the second waveguide; and
an optical switch configured to optically couple the first and second waveguides, wherein in response to the optical switch optically coupling the first and second waveguides, the second optical signal detection circuit generates a fourth electrical signal based on the modulated optical signal and the data polarity detection circuit detects the polarity of the data carried by the modulated optical signal based on the fourth electrical signal.

6. The system of claim 5, wherein the data polarity switching circuit is included in the data reception path such that the third electrical signal is the fourth electrical signal generated by the second optical signal detection circuit.

7. The system of claim 5, wherein in response to the optical switch optically decoupling the first and second waveguides, the second optical signal detection circuit receives a transmitted optical signal from another system and generates the fourth electrical signal based on the transmitted optical signal.

8. A method of optical modulator calibration, the method comprising:
modulating, by an optical modulator, a received optical signal with a first electrical signal to generate a modulated optical signal, a polarity of data carried by the modulated optical signal, and an optical power of the modulated optical signal based on a temperature of the optical modulator;
monitoring the optical power of the modulated optical signal;
in response to the optical power of the modulated optical signal being below or equal to an optical power threshold, adjusting the temperature of the optical modulator;
continuing to monitor the optical power of the modulate optical signal after adjusting the temperature of the optical modulator and adjusting the temperature of the optical modulator until the optical power of the modulated optical signal is above the optical power threshold; and
in response to the optical power of the modulated optical signal being above the optical power threshold, comparing the polarity of the data carried by the modulated optical signal with a polarity of data carried by the first electrical signal instead of adjusting the temperature of the optical modulator.

9. The method of claim 8, wherein in response to the polarity of the data carried by the modulated optical signal being different from the polarity of the data carried by the first electrical signal, the method further comprises changing a polarity of data of a third electrical signal.

10. The method of claim 9, wherein the received optical signal is modulated in a data transmission path of a system and the polarity of the data of the third electrical signal is changed in a data reception path of the system.

11. The method of claim 9, further comprising:
re-checking the polarity of the data carried by the modulated optical signal; and
in response to the polarity of the data carried by the modulated optical signal being different from the polarity of data carried by the first electrical signal, the method further comprises:
increasing the optical power threshold;
performing the acts of:
monitoring the optical power of the modulated optical signal;
in response to the optical power of the modulated optical signal being below or equal to the optical power threshold, adjusting the temperature of the optical modulator;
continuing to monitor the optical power of the modulate optical signal and adjusting the temperature of the optical modulator until the optical power of the modulated optical signal is above the optical power threshold; and
in response to the optical power of the modulated optical signal being above the optical power threshold, comparing the polarity of the data carried by the modulated optical signal with a polarity of data carried by the first electrical signal instead of adjusting the temperature of the optical modulator.

12. The method of claim 8, further comprising in response to the optical power of the modulated optical signal being above the optical power threshold, changing a data pattern of the data of the first electrical signal.

13. The method of claim 12, wherein the data pattern is a first data pattern, wherein the first electrical signal has a second data pattern when the optical power of the modulated optical signal is below or equal to the optical power threshold, wherein the first data pattern is an approximately fifty percent duty-cycle that oscillates between a high level and a low level and the second data pattern randomly oscillates between the high level and the low level.

14. The method of claim 8, further comprising generating a second electrical signal based on the modulated optical signal, wherein the optical power of the modulated optical signal is monitored by monitoring power of the second electrical signal and the polarity of the data carried by the modulated optical signal is monitored by checking a polarity of data carried by the second electrical signal.

15. The method of claim 8, further comprising:
generating a second electrical signal based on the modulated optical signal using a first signal detection circuit, wherein the optical power of the modulated optical signal is monitored by monitoring power of the second electrical signal; and
generating a third electrical signal based on the modulated optical signal using a second signal detection circuit, wherein the polarity of the data carried by the modulated optical signal is monitored by checking a polarity of data carried by the third electrical signal.

16. A method of optical modulator calibration, the method comprising:
modulating, by an optical modulator, a received optical signal with a first electrical signal to generate a modulated optical signal, a polarity of data carried by the modulated optical signal, and an optical power of the modulated optical signal based on a temperature of the optical modulator;
monitoring the optical power of the modulated optical signal;
in response to the optical power of the modulated optical signal being above an optical power threshold, comparing the polarity of the data carried by the modulated optical signal with the polarity of data carried by the first electrical signal instead of adjusting the temperature of the optical modulator.
in response to the polarity of the data carried by the modulated optical signal being different from the polarity of the data carried by the first electrical signal, changing the polarity of the data of the first electrical signal;
re-checking the polarity of the data carried by the modulated optical signal; and
in response to the polarity of the data carried by the modulated optical signal being different from the polarity of data carried by the first electrical signal, increasing the optical power threshold.

17. The method of claim 16, wherein after increasing the optical power threshold, the method further comprises:
monitoring the optical power of the modulated optical signal;
in response to the optical power of the modulated optical signal being below or equal to the optical power threshold, adjusting the temperature of the optical modulator;
continuing to monitor the optical power of the modulate optical signal and adjusting the temperature of the optical modulator until the optical power of the modulated optical signal is above the optical power threshold; and
in response to the optical power of the modulated optical signal being above the optical power threshold, comparing the polarity of the data carried by the modulated optical signal with a polarity of data carried by the first electrical signal instead of adjusting the temperature of the optical modulator.

18. The method of claim 9, wherein the received optical signal is modulated in a data transmission path of a system and the polarity of the data of the third electrical signal is changed in the data transmission path of the system.

19. The system of claim 1, wherein data polarity switching circuit is configured to switch the polarity of the data carried by the third electrical signal and to output the third electrical signal with the switched polarity of the data as the first electrical signal.

* * * * *